United States Patent Office 3,402,978
Patented Sept. 24, 1968

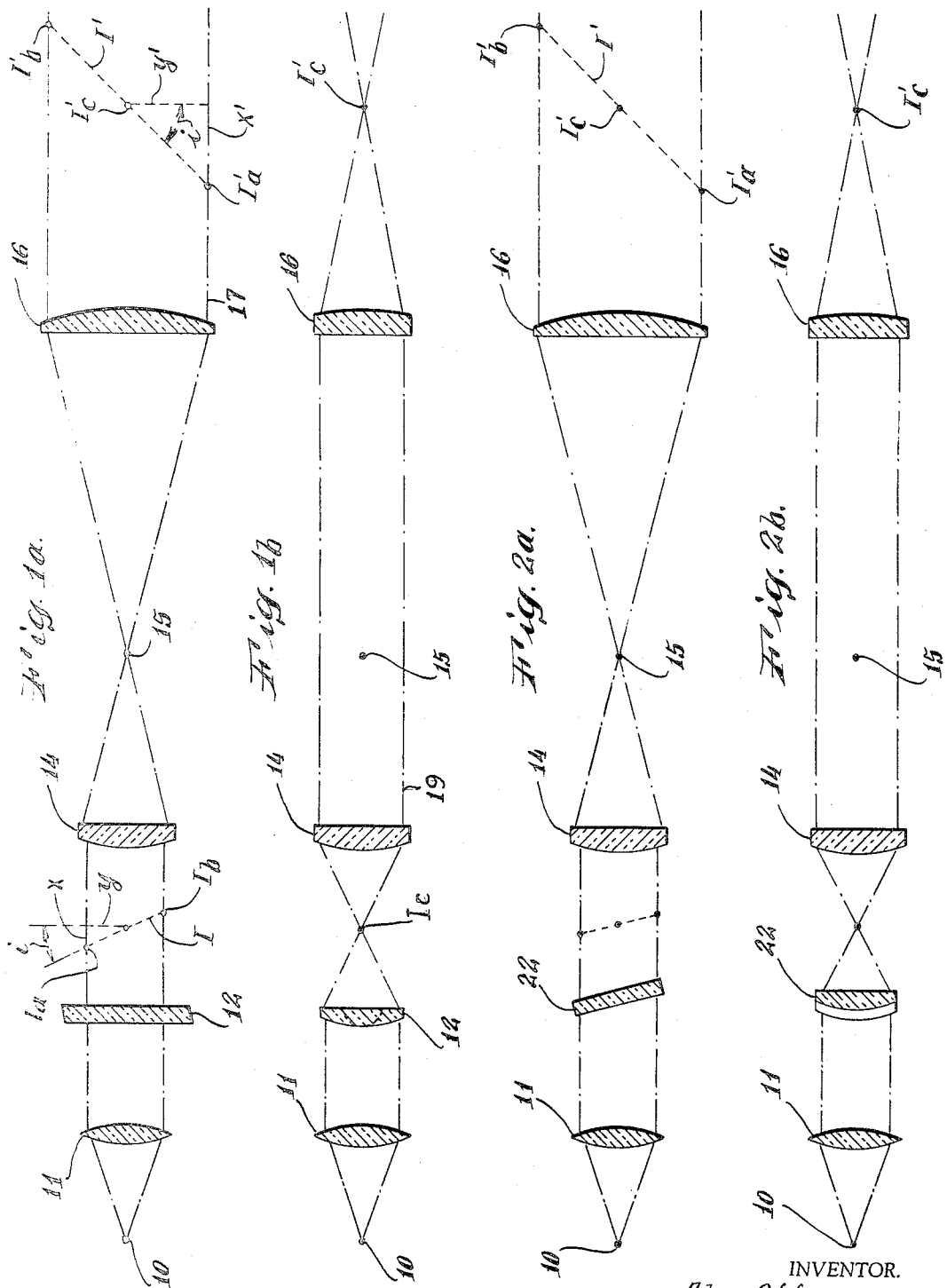

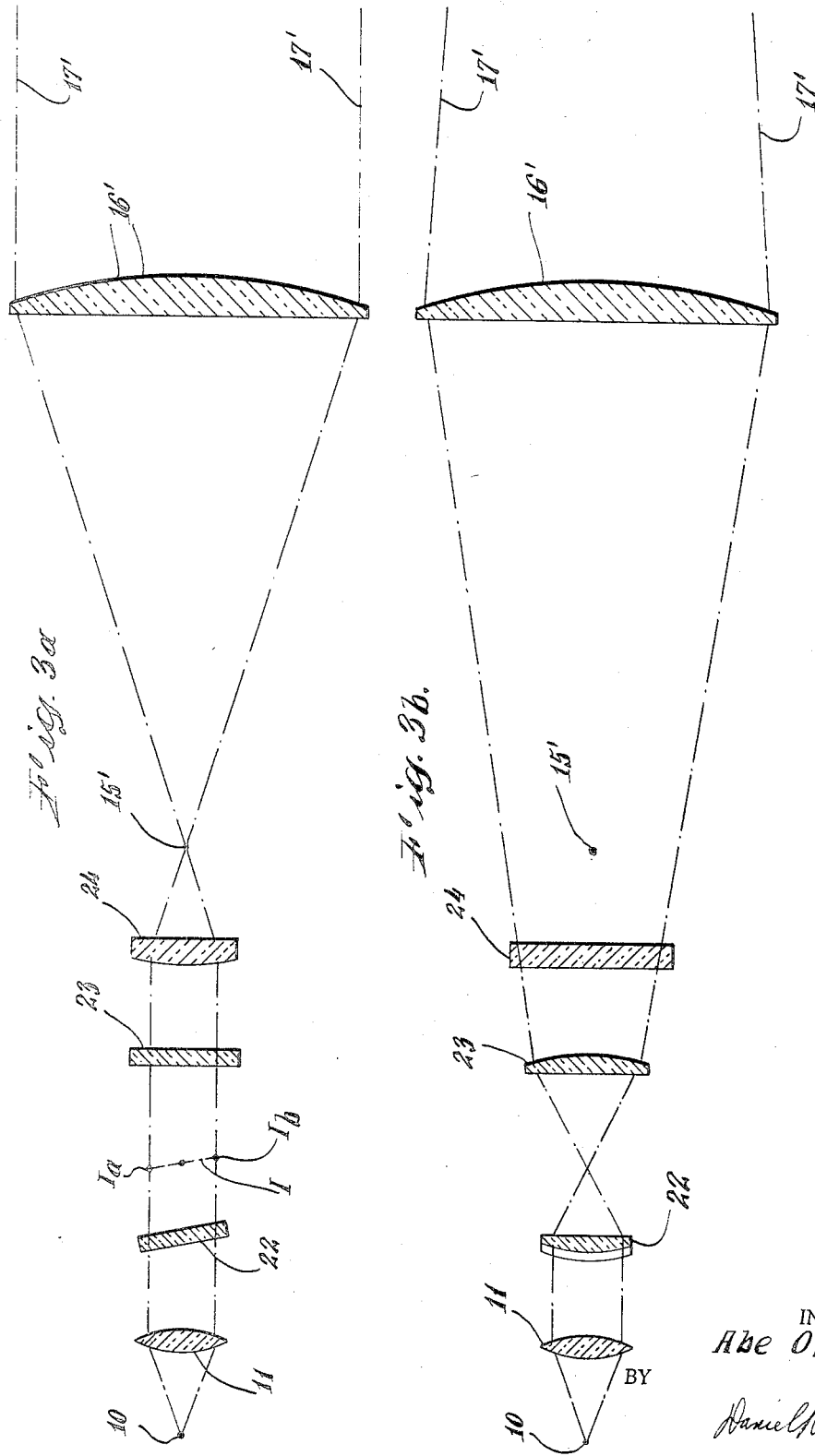

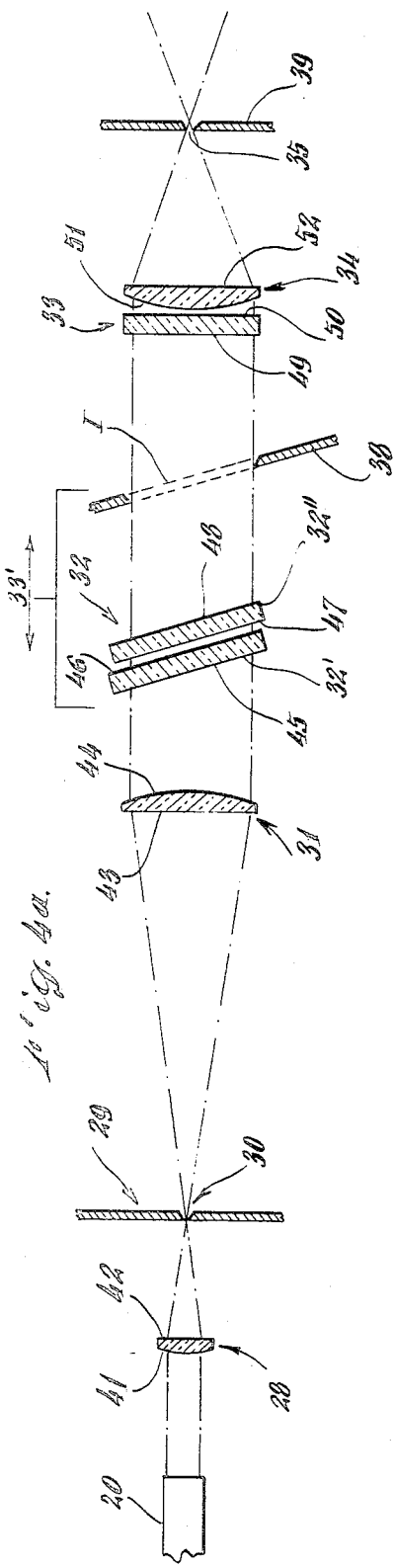
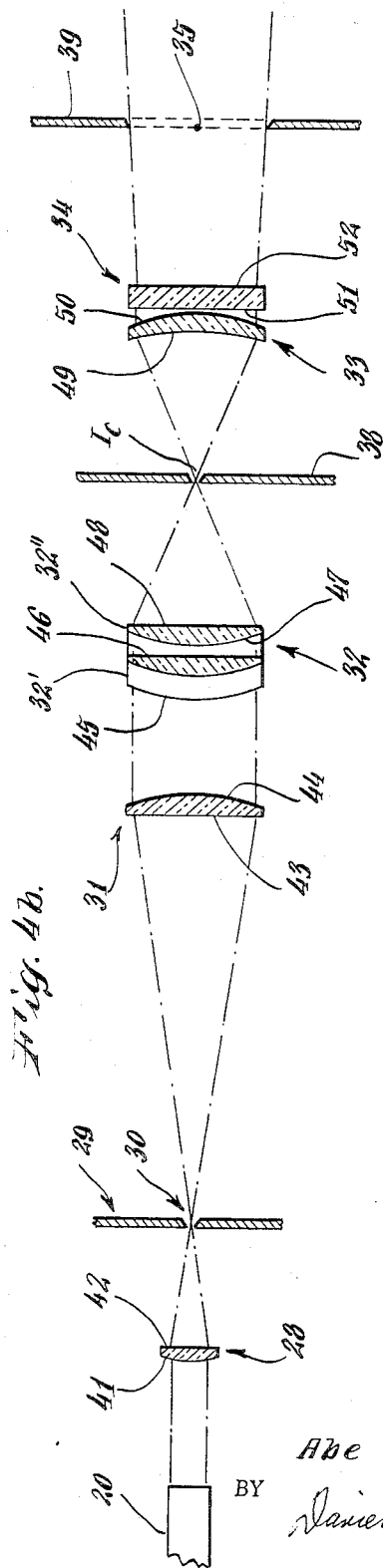

3,402,978
OPTICAL SYSTEM, SIMULATING A
CONICAL LENS
Abe Offner, Darien, Conn., assignor to The Perkin-Elmer
Corporation, Norwalk, Conn., a corporation of New
York
Filed June 23, 1966, Ser. No. 559,878
9 Claims. (Cl. 350—40)

This invention relates to an optical system. More particularly the invention concerns such a system having the same optical characteristics as a variable focal length conical lens. A conical lens is an optical element or assembly having properties somewhat similar to a cylindrical lens (i.e., focusing a point source as a line image), but having a focal length that varies linearly with the distance from the optical axis in its nonpower direction. For this reason a conical lens will focus a point image as a line which is tilted (i.e., not perpendicular) with respect to the optical axis.

As implied in its name, a conical lens may be formed by cutting a cone of solid optical material along a plane parallel to an element of the cone (i.e., a plane parallel to a plane tangent to the curved surface of the cone). Although conical lenses of relatively short focal length and moderate useful aperture in the nonpower direction may be practically made by the simple expedient of forming a solid cone of, for example, optical glass and then cutting a section therefrom in the manner just stated, such a technique becomes less and less practical the larger the various parameters (e.g., focal length, aperture in the nonpower direction) of the desired conical lens becomes. In other words, a long focal length conical lens must of necessity be cut from a very large solid cone, since the curvature must be relatively small (i.e., radius of curvature must be relatively large). If the aperture in the nonpower direction (i.e., along the height of the cone from which it may be made) is large, an extremely large piece of optical glass is required.

The present invention comprises an optical system which has the same properties as a large conical lens of long focal length, without requiring the production of a conical lens having a large radius of curvature (i.e., from a large solid cone). In its simplest form, the invention illustrates how a large conical lens of long focal length may be simulated by a small conical lens of relatively short focal length, and a subsidiary spherical lens telescopic system. In a somewhat more sophisticated alternative aspect the invention illustrates how a long focal length conical lens may be simulated by means of a tilted cylindrical lens (or lens system) when used in conjunction with other, solely spherical, optical elements. A more advanced version of this latter system is illustrated, in which one of the spherical additional components is replaced by two crossed cylindrical lens components, thereby allowing adjustment of the dioptric effects in a first plane along the optical axis without affecting the dioptric characteristics in the plane perpendicular to this first plane. This version allows the simulation of a whole series of conical lenses of different configuration by a single set of cylindrical lenses; or stated in other words, it simulates a conical lens having a rate of change in focal length along its nonpower direction which may be varied as desired. Finally, a specific embodiment of a highly corrected version of this last type of system is presented.

An object of the invention is therefore the provision of an optical system which has the same optical characteristics as a long focal length, large conical lens, which avoids the manufacturing difficulties of producing large conical elements from a large solid cone of optical material.

A further object of the invention is the provision of an optical system which exhibits the properties of a conical lens, without requiring the manufacture of any conical-shaped lenses at all.

Another object of the invention is the provision of an optical system which has the optical properties of a more versatile conical lens, in which the rate of change of focal length with the distance from the optical axis in the nonpower direction is variable.

Further objects and features of the invention will be obvious to one skilled in the art upon reading the following specification in conjunction with the accompanying drawings in which:

FIGURE 1a is a schematic cross-sectional view (hereinafter arbitrarily called the vertical section) through a simple illustrative embodiment of the invention, showing the manner in which a small diameter, relatively short focal length, conical lens may be made to simulate a larger, longer focal length conical lens element;

FIGURE 1b is a schematic cross section of the system shown in FIGURE 1a, taken along a plane through the optical axis which is perpendicular to that of FIGURE 1a (and is therefore hereinafter to as a horizontal section);

FIGURE 2a is a schematic vertical section of one embodiment of the invention, in which a small tilted cylindrical lens and additional spherical elements forming a telescopic system simulate the optical characteristics of a large conical lens, which conical lens exhibits a greatly varying radius of curvature along the axis defining its variable power;

FIGURE 2b is a schematic horizontal section through the same system shown in FIGURE 2a;

FIGURE 3a is a schematic vertical section through another similar embodiment of the invention, in which a tilted cylindrical lens, a pair of crossed cylindrical lenses and a spherical element in telescopic arrangement with the crossed cylinders simulates a variable conical lens of relatively long focal length and large aperture;

FIGURE 3b is a schematic horizontal section through the same system as shown in FIGURE 3a;

FIGURE 4a is a schematic vertical section through a highly corrected, specific embodiment of the invention; and FIGURE 4b is a horizontal sectional through this same specific embodiment.

A basic principle of the invention is illustrated in the relatively simple optical system shown in FIGURES 1a and 1b. In these figures light from a point source is collimated by a spherical lens 11 before reaching conical lens 12. The illustrated conical lens 12 may be formed by cutting an upright cone (i.e., with the vertex at the top) by a plane parallel to the left-hand edge or element of the cone. Accordingly, the upper part of conical lens 12 (as viewed in FIGURE 1a) will have a radius of curvature (on its left-hand surface) which is smaller than the radius of curvature of the lower part of the left-hand side. In other words the upper part of lens 12 will be more greatly curved so as to conform to the smaller circular cross section of the part of the cone near its apex, while the lower part of the left-hand surface of lens 12 will have a lesser curvature corresponding to the greater size of the circle of cross section near the cone base. In fact the radius of curvature of the left-hand side of lens 12 (as viewed in FIGURE 1a) will linearly increase from top to bottom. Accordingly, the upper part of the lens will have a shorter focal length than the bottom. For this reason the collimated rays passing through the very top part of lens 12 in FIGURE 1a will be converged to a point, $I_a$, nearer to the lens than will the collimated rays passing through the bottom of lens 12. In fact the collimated rays entering lens 12 from point source 10 will be focused to form a straight line image, I, which is tilted in the manner shown in FIGURE 1a.

Since FIGURE 1b is a central cross section through the center of FIGURE 1a, the plane of intersection will be through the central point $I_c$, which point is indicated also in FIGURE 1a. In other words the central horizontal section of FIGURE 1b shows the manner in which the rays mid-way between the top and bottom of conical lens 12 (as viewed in FIGURE 1a) are focused to a point, which may be considered the mean focal point of conical lens 12. Horizontal sections taken perpendicularly through FIGURE 1a above the center would look similar to FIGURE 1b, except that the rays would come to a focal point nearer to lens 12 than indicated in FIGURE 1b, since the upper part of lens 12 (as viewed in FIGURE 1a) has constantly increasing dioptric power (i.e., linearly decreasing radius of curvature) as such horizontal sections approach the top of lens 12. As may be noted in FIGURE 1a, conical lens 12 has no dioptric power whatsoever in the vertical plane.

It may be noted here that the terminology "vertical" and "horizontal" will be used throughout this description for purposes of clearly indicating which of the planes is intended. Although the terms "vertical" and "horizontal" will be used throughout the specification in this manner, it is obvious that the terms are only relative, since rotation of the optical system about its own axis by 90 degrees will change the physical orientation of not only the non-symmetrical optical elements, but also the line images formed. For this reason the term "vertical" will be utilized in a manner to indicate the situation shown in FIGURE 1a, and the term "horizontal" will mean situations analogous to those shown in FIGURE 1b; therefore these terms are utilized solely as a convenience in referring to the relationship intended and are not limited to any specific physical directions.

To the right of conical lens 12 and its line image, I, are placed two spherical lens components, 14 and 16, respectively. The two spherical lens components, 14 and 16 are of such dioptric power and so positioned relative to each other, that they are in telescopic arrangement. As is well known, this means that they are spaced apart by a distance equal to the sum of their focal lengths. When both lenses are convergent (as in FIGS. 1a and 1b) they will have a common focal point at a single point between the two lenses. It is, of course, possible to use other telescopic systems, such as for example a convergent and a divergent lens so arranged as to form the well-known Galilean telescope. In the FIGURES 1a and 1b form, the common focal point is designated 15. Since in the plane of this figure the rays are unaffected by conical lens 12, the collimated rays in this plane from collimating lens 11 will reach spherical lens 14 in unaffected collimation. Since point 15 is the principal focal point of lens 14, the rays will be focused to this point in the plane shown in FIGURE 1a. Since point 15 is also a focal point of spherical lens 16, the rays will be again collimated by this lens after they have passed therethrough as indicated at 17'.

For purposes of illustration, it is also assumed that the left-hand principal focal point of lens 14 is also coincident with the central image point $I_c$ as shown in FIGURE 1b. In other words the mean focal point of conical lens 12 (i.e., the focal point of the mid-zone of the lens as viewed in FIGURE 1a) and the left-hand focal point of spherical lens 14 are coincident at point $I_c$ in FIGURE 1b. Because of this relationship, the rays in the horizontal central section shown in FIGURE 1b will be collimated by spherical lens 14 as indicated by parallel rays 19. For this reason the second spherical lens 16 will focus these parallel rays at its right hand principal focal point, as indicated at $I'_c$. As schematically illustrated by image I' in FIGURE 1a, rays from image I above and below the central point $I_c$ will be focused at differing distances from lens 16. More specifically, the uppermost point $I_a$ in image I will be focused by the telescopic system at point $I'_a$ (nearer to lens 16 than central image point $I'_c$); and the lowermost point $I_b$ of image I will be focused at a point most remote from lens 16, namely, at $I'_b$. More generally, the various points of image I will be reimaged by the telescopic system of lenses 14 and 16 along a tilted straight line image I'.

Besides the obvious reversal of the direction of tilt of this image I' relative to the original image I, the tilt thereof will differ, depending upon the magnification of the telescopic system comprising lenses 14 and 16. This comes about because in optical systems generally the longitudinal magnification is equal to the square of the lateral magnification. Thus in the telescopic system of FIGURES 1a and 1b the lateral magnification, $m_a$, is given by:

$$m_a = -f_2/f_1$$

wherein $f_1$ is the focal length of the first spherical lens 14, and $f_2$ is the focal length of the second lens 16.

The ratio of the image heights (i.e., the vertical extent of the images in FIG. 1a) is simply the lateral magnification; that is:

$$y'/y = -m_a$$

wherein $y$ is the half height of original image I, and $y'$ is the half height of the final image I'. On the other hand the ratio between the longitudinal separations (i.e., as measured parallel to the optical axis) of the edge and center of the first image I ($x$) and of the final image I' ($x'$) is given by the longitudinal magnification, $M_o$ (and therefore the square of the lateral magnification, $m_a$); that is:

$$x'/x = M_o = m_a^2$$

If the angle that the original image I makes with the vertical in FIG. 1a is designated $i$ and the corresponding angle of the final image I' to the vertical is defined as $i'$, we may see the following central trigonometric relationships:

$$\tan i = x/y$$

and $$\tan i' = x'/y'$$

Dividing the last equation by the next-to-last equation and rearranging terms gives:

$$\frac{\tan i'}{\tan i} = \frac{x'/y'}{x/y} = \frac{x'/x}{y'/y}$$

Since the enumerator of the last term of the above equation is equal to the longitudinal magnification (or the square of the lateral magnification) and the denominator of this same term is equal (except for sign) to the lateral magnification, we may write:

$$\frac{\tan i'}{\tan i} = M_o/-m_a = m_a^2/-m_a = -m_a$$

The minus sign in this last equation indicates that the tilt angles are of opposite sign (i.e., the image has been inverted by the optical system).

Although nontelescopic systems have similar relationships, the final image of such systems bears a more complicated relationship to the original image because of the fact that the lateral magnification ($m_a$) of such systems is not constant, but rather varies as a function of the conjugates utilized.

Therefore if the focal length of lens 14 is substantially shorter than that of lens 16 (as is true of the illustrative example of FIGURE 1a), the second image I' will be tilted at a greater angle relative to the vertical than the first image I, as shown. As a somewhat arbitrary example, if lens 14 has a focal length of two (2) inches and lens 16 has a focal length of five (5) inches, the lateral magnification of the system will be 5/2 or 2.5, and the tangent of the angle $i'$ of the image I' will be 2.5 times as large as the tangent of the angle that the original image I makes with the vertical. For example, with a magnification of 5/2, if the conical lens 12 causes image I to be canted at 20 degrees from the vertical, the final image I' will be canted at 42.3 degrees (the tangent of 20 degrees being .364 and the tangent of 42.3 degrees being .91 or 2.5 times as great).

It might be noted that a telescopic system causes no change in the distribution of energy of the straight line image, because such a system inherently has equal angular magnification for all conjugates. A telescopic system combined with a conical lens as illustrated in FIGURES 1a and 1b will therefore allow the image to be tilted at a greater angle than can be practically realized with a single conical lens. Thus in order to obtain directly the image I' by means of a conical lens, its focal length would have to vary very rapidly along its vertical axis (i.e., the radius of curvature at the top of the conical lens would be very different from the radius of curvature at the bottom). In other words, the cone from which it was made would have to have a very large apex angle. If a large image (such as shown at I' in FIGURE 1a) is desired at such a great tilt, it would become extremely difficult to make a conical lens of great enough physical dimensions (i.e., usable aperture) that varies in focal length at such a rapid rate. Therefore FIGURES 1a and 1b illustrate one manner in which a different conical lens (which is difficult or even impossible to make from a cone) may be simulated by a relatively easy-to-obtain conical lens. However, the invention is by no means limited to this specific combination. As will appear subsequently, the invention is preferably utilized to simulate a difficult conical lens from a plurality of cylindrical and spherical lens components (i.e., without using any actual conical lens).

In addition, the invention allows the simulation of different conical lenses by changes in nonconical lens elements. For example in the simple version of FIGS. 1a and 1b, different spherical lenses (having differing dioptric power) may be substituted for either lens 14 or lens 16 or both. Simply by positioning the second such lens (i.e., the one corresponding to lens 16) in the appropriate position to maintain the telescopic relationship, both the size and angle of tilt of the final image (corresponding to I') may be varied. Thus a whole series of conical lenses of different optical parameters may be simulated by a single conical lens 12 and a series of different spherical lenses. As will appear subsequently, even conical lens 12 may be eliminated (i.e., another, namely, a cylindrical element, may be substituted); and in addition even greater versatility of the system may be effected by using a more sophisticated telescopic lens system.

FIGURES 2a and 2b are schematic vertical and horizontal sections through a system somewhat similar to that shown in FIGURES 1a and 1b, but in which no actual conical lens is used at all, although the final result is substantially the same. In FIGURES 2a and 2b, the same point source 10 and spherical collimating lens 11 are shown, so that the light to the right of lens 11 is collimated in the same manner as previously described. Similarly spherical lenses 14 and 16 are assumed to be identical to the corresponding elements shown in FIGURES 1a and 1b. In fact, all elements in FIGURES 2a and 2b which correspond exactly to those shown in FIGURES 1a and 1b are numbered in a like manner.

The basic difference is that the lens producing the first image I in FIGURES 2a and 2b is not a conical lens, but rather is a cylindrical lens 22 tilted from vertical in the manner best seen in FIGURE 2a. Such a tilted cylindrical lens will focus collimated light to a tilted straight line image in the manner best seen by comparing image I in FIGURES 2a and 2b. In particular the collimated light passing through the upper part of tilted cylindrical lens 22 in FIGURE 2a will be focused at a distance from that part of the cylindrical lens equal to the focal length of the cylinder. Similarly, the light that passes through the lower part of the tilted cylindrical lens 22 in FIGURE 2a will be focused at a point which is the same distance behind the corresponding lower part of the cylinder 22. Therefore, the tilted cylindrical lens 22 will produce a tilted line image I which is exactly parallel to the tilted (originally vertical) axis of this lens. Spherical lens 14 will focus the collimated light at point 15, which is the common focal point of telescopically arranged lenses 14 and 16, so that lens 16 will render rays 17 again parallel in the vertical plane shown in FIGURE 2a.

Just as the substitution of a tilted cylindrical lens 22 for the conical lens 12 causes the imagery in the vertical plane in FIGURE 2a to be substantially identical to that in FIGURE 1a, similarly the imagery in the central horizontal plane as shown in FIGURE 2b is identical to the corresponding imagery of FIGURE 1b. For this reason all of the elements in FIGURE 2b are labeled identical to the elements in FIGURE 1b, except as to cylindrical lens 22 (which replaces conical lens 12). If the cylindrical lens 22 has the same curvature as the mean or central zone of conical lens 12, the image $I_c$ of the center of the line image I in FIGURE 2b will be exactly the same point as in FIGURE 1b. Horizontal sections through the FIGURE 2b system above and below the central horizontal section shown would of course indicate that the crossing point of rays in horizontal planes above the plane of the paper in FIGURE 2b (i.e., nearer the top of lens 22 in FIGURE 2a) will occur more to the left than the image $I_c$ of the central point. Similarly, in horizontal planes below the plane of the paper in FIGURE 2b (i.e., nearer the bottom of the lens 22 in FIGURE 2a) the crossing points will occur more to the right than the central image $I_c$.

Thus, the tilted cylindrical lens in FIGURES 2a and 2b will cause the same type of tilted image at I as does the conical lens 12 in FIGURES 1a and 1b. If the tilt of the cylindrical lens 22 is adjusted, it may be made to simulate more than one particular conical lens, since such tilt variation has the analogous effect of varying the apex angle (i.e., rate of curvature change) of the cone from which the conical lens 12 was made. Since the rest of the optical system is identical, the imagery and all other characteristics of the optical system shown in FIGURES 2a and 2b will be identical to the optical systems shown in FIGURES 1a and 1b. Thus, FIGURES 2a and 2b illustrate how a tilted cylindrical lens may be utilized to perform the same function as a conical lens. Further FIGURES 2a and 2b indicate how a small moderately tilted cylindrical lens will form a moderately tilted original image (I), which in turn may be reimaged by a magnifying telescopic system, which not only increases the linear extent of the image at I' relative to the original image at I, but also increases the tilt of the final image, I'. Thus, a cylindrical lens of moderate clear aperture and moderate tilt may be used in conjunction with a magnifying telescopic system so as to yield a larger image of greater tilt. Such a system thus allows the simulation of a conical lens having a relatively large aperture and a relatively rapid variation of its focal length (i.e., its radius of curvature) along its non-power direction by an optical system in which the nonspherical component is small.

FIGURES 1a and 1b on the one hand and FIGURES 2a and 2b on the other hand illustrate the two basic principles on which the more versatile and complicated versions of the invention operate, as will appear subsequently. More explicity FIGURES 1a and 1b illustrate the manner in which a telescopic system used in conjunction with a conical lens may increase both its effective aperture and the apparent variation of its dioptric power along its non-power direction (i.e., in the vertical direction in FIG. 1a).

In terms of results this means that a larger image of relatively great tilt may be obtained from a conical lens of moderate aperture and moderate variation of its dioptric power. This allows the simulation of a conical lens, which if actually made would have to be cut from a large (in height) cone of extremely large apex angle (thereby being extremely wide at its base). The second advantageous characteristic of the invention (as illustrated in FIGURES 2a and 2b) is the ability of the invention to simulate a conical lens by the use of a tilted cylindrical lens. Since FIGURES 2a and 2b also illustrate the use of a magnifying telescopic system in conjunction with such a tilted cylinder, these figures also show how a relatively large aperture conical lens of relatively rapidly varying effective dioptric power may be simulated by use of a relatively small, moderately tilted cylindrical lens. These same general principles are utilized in the more complicated embodiments which follow. These latter versions have even greater versatility than pointed out above.

The version shown in FIGURES 3a and 3b is very similar to the FIGURES 2a and 2b version just described. In fact the light source 10, the first collimating or condensing lens 11, and the tilted cylindrical lens 22 in FIGURES 3a and 3b may be identical to the correspondingly referenced elements in FIGURES 2a, 2b. Since the light between spherical condensing lens 11 and tilted cylindrical lens 22 is collimated, the spacing between these two elements may be changed without affecting the behavior of the system beyond (i.e., to the right) of the tilted cylinder 22. In order to save space, cylindrical lens 22 will normally be placed reasonably close to spherical lens 11, and this relationship is indicated in FIGURES 3a and 3b. Therefore despite the change in position of cylinder 22 (assuming that the cylinder 22 in FIGURES 3a and 3b is identical in all respects, including tilt, to that in FIGURES 2a and 2b), the first image formed in FIGURES 3a and 3b (I) will be identical in all respects to that formed in FIGURES 2a and 2b. Momentarily skipping the next two optical elements, one may see that the last large spherical component (at the right-hand side of FIGURES 3a and 3b) performs substantially the same function as the corresponding spherical element in FIGURES 2a and 2b; this correspondence may thus be seen by comparison of FIGURE 3a with FIGURE 2a. For this reason the last element in FIGURES 3a and 3b is referenced 16' to indicate its similar but slightly different function and structure to the almost corresponding element in FIGURES 2a and 2b.

In place of the single spherical lens 14 in FIGURES 2a and 2b, the version of FIGURES 3a and 3b has two cylindrical lenses 23 and 24. These lenses are not tilted, but rather have their power axis exactly perpendicular to the optical axis of the system. Although their power axis is in the same plane (i.e., the plane perpendicular to the optical axis and the plane of the paper in both FIGURES 3a and 3b), their power axes are perpendicular to each other. Thus cylindrical lens 23 is oriented in a manner generally similar to cylindrical lens 22 (except that the former is not tilted), while cylindrical lens 24 has its power axis crossed (i.e., at right angles) to the power axis of lens 23. Stated in functional terms, cylindrical lens 23 has no power in the vertical plane, as may be seen in FIGURE 3a, but has converging dioptric power in the horizontal plane of FIGURE 3b. Conversely, cylindrical lens 24 has its power so as to converge light in the vertical plane as shown in FIGURE 3a, but exhibits no dioptric power to rays in the horizontal plane (see FIGURE 3b). In all but one respect, the two crossed cylindrical lenses 23 and 24 will act as a single spherical lens. Specifically, cylindrical lens 24 and final spherical lens 16' are in telescopic arrangement relative to the vertical plane shown in FIGURE 3a. In other words point 15' in FIGURE 3a is a common principal focal point of cylindrical lens 24 and spherical lens 16', as is obvious from the geometry of the rays in FIGURE 3a. It is not as obvious (in FIGURE 3b) that the right-hand principal focal point of cylindrical lens 23 and the left-hand principal focal point of spherical lens 16' are also at this common point 15'. In other words, cylindrical lens 23 and spherical lens 16' are in telescopic arrangement relative to the horizontal plane of FIGURE 3b.

Cylindrical lenses 23 and 24 in conjunction with spherical lens 16' determine where the various points on line image I are actually re-imaged. Specifically the square of the ratio of the focal length of spherical lens 16' to the focal length of cylindrical lens 23 determines the longitudinal magnification $M_{oh}$ (equal to $x'/x$) of the final tilted line image (i.e., the dimension that this final image extends along the optical axis). On the other hand, it is the ratio of the focal lengths of cylindrical lens 24 and spherical lens 16' which determines how wide will be the final collimated beam at 17' in the vertical section of FIG. 3a, or in other words, the lateral magnification of the final image, $m_{av}$; i.e., its height, $y'$, in the "vertical" direction perpendicular to the optical axis relative to the height of the original image, or $y'/y$. Thus the tilt of the final image is affected by both the focal length ratio of cylinder 24 to that of lens 16', and the (square of the) focal length ratio of cylinder 23 to that of lens 16'.

The relationship between the tilt angle $i$ of the original image (I) and the tilt angle $i'$ of the final image (not shown in FIGS. 3a and 3b, but analogous to the image I' shown in FIGS. 2a and 2b) is now given by:

$$\frac{\tan i'}{\tan i} = \frac{M_{oh}}{-m_{av}} = \frac{m_h^2}{-m_v}$$

wherein $m_h$ is the ratio of the focal length of lens 16' divided by the focal length of cylinder 23, so that $m_h^2$ is the longitudinal magnification $M_{oh}$ (equal to $x'/x$) contributed by these last two mentioned lenses, caused by their dioptric power in the horizontal plane (FIG. 3b); and $m_v$ is the ratio of the focal lengths of lens 16' and cylinder 24, that is, $m_v$ is identical to the lateral magnification, $m_{av}$ (equal to $y'/y$) contributed by the dioptric power of these two lenses in the vertical plane (FIG. 3a). We may therefore (somewhat loosely) refer to $M_{oh}$ or $m_h^2$ as the "horizontal" longitudinal magnification, and $m_v$ (or $m_{av}$) as the "vertical" lateral magnification, since the terms "horizontal" and "vertical" define the dioptric power planes of the elements causing these two different magnifications. However, the conventional terms "longitudinal" and "lateral" retain their usual meanings of along the optical axis and perpendicular to the optical axis (in this case, in the vertical plane of FIG. 3a), respectively, as applied to the actual direction in which the magnification occurs.

Because of the more or less independent effects of the two cylindrical lenses 23 and 24 in the horizontal and vertical planes respectively, the system shown in FIGURES 3a and 3b has greater versatility than the system of FIGURES 2a and 2b. For example, cylindrical lens 23 may be replaced by a different cylindrical lens of different focal length (such substituted cylindrical lens still being placed a focal length away from point 15'), thereby increasing or decreasing the tilt of the final image relative to the original image I (by varying $m_h$ and therefore $M_{oh}$) without substantially affecting the behavior of the rays in the other (vertical) plane (i.e., in the vertical planes the rays will still behave as shown in FIGURE 3a, so that the "height," $y'$, of the tilted image remains constant).

Additionally the fact that the designer may change the relative focal length of the two cylindrical lenses 23 and 24, allows him another degree of freedom in designing an efficient system to accomplish the particular purpose desired. For example, he may choose the focal length of cylindrical lens 23 and spherical lens 16' so as to cause the final image to occur at a convenient distance behind lens 16'. Although the distance between cylindrical lens 23 and spherical lens 16' is determined by their focal length (since they are in telescopic relationship, the distance must equal the sum of their focal lengths), nevertheless, in addition both may be moved together toward or away from image I so as to move the final image produced at the right-hand conjugate focal plane of the telescopic system composed of lenses 23 and 16' an equal amount to the most convenient position. The necessary clear apertures (i.e., the useful diameters of lenses 23 and 16') relative to each other will then be determined by the geometry of the rays in the horizontal plane (e.g., see FIGURE 3b). Even after all these parameters have large spherical lens 16' is substantially filled. Thus the FIGS. 3a and 3b embodiment allows simulation of essentially any conical lens in an efficient manner.

The following is given as a specific example of a system corresponding to that shown in FIGURES 3a and 3b:

TABLE I.—PHYSICAL CONSTANTS

| Element | Description | Effective Focal Length | Clear Aperture | Distance Between Elements |
|---|---|---|---|---|
| 10 | Point source | | | |
| 11 | Spherical lens | E | 2 | E |
| 22 | Tilted cylinder | h 6 | 2 | S |
| I$_c$ | Tilted image center | | (2) | 6 |
| 23 | Cylinder | h 50 | h 9.3, v 2 | 27.8 |
| 24 | ___do___ | 38 h 12 v 12 | h 2.3, v 2 | |
| 15' | Common focal point of lens 23, 24 and 16' | | | |
| 16' | Spherical lens | 372 | h 72, v 62 | 372 |
| | Final image center | | (v 62) | h 1,600 |

Symbols for above table: E=Arbitrary but equal; S=Arbitrary but reasonably small in practice (i.e., about 10), h=In "horizontal" plane; v=In "vertical" plane.

been chosen, the designer may still choose the focal length of the other cylindrical lens 24 so as to cause the rays in the vertical section (i.e., FIG. 3a) to fill the clear aperture of lens 16' in this plane. In actual practice the focal lengths of the two cylinders 23 and 24 will be chosen together to give the desired apparent tilt while filling the desired aperture of lens 16' in both planes.

Since the tilt angle of the final image may be varied by substituting for either or both of the cylindrical lenses (23, 24) another cylindrical lens of different focal length, the optical system of FIGS. 3a and 3b is extremely versatile. Because of this independent choice of the focal lengths of each of the cylinders 23 and 24, the FIGS. 3a and 3b system may simulate a conical lens of almost any dimensions and optical characteristics. In this manner the equivalent of a whole series of conical lenses is obtained from a series of relatively simple cylindrical lenses. If a plurality of lenses, say, $p_3$, lenses are available to be used as the first cylinder 23, and another plurality of lenses, say $p_4$, are available to be interchanged for cylindrical lens 24, the total number of different conical lenses which may be simulated are $p_3$ multiplied by $p_4$. Thus an available series of ten lenses for each of the two cylindrical lenses (i.e., a total of only 20 cylinders) may simulate 100 different conical lenses. In fact since it is possible to utilize one of the series of lenses "intended for" lens 23 as a replacement instead for lens 24 (positioned with its power axis in the plane which is perpendicular to the plane containing its power axis when it was used at 23), the possible number of combinations from, say, 20 different cylindrical lenses is substantially more than 100. In the system shown in FIGS. 2a and 2b, although one can alter both the tilt and size of the final image I' by substituting different spehiracl lenses for lens 14, one cannot independently vary these two characteristics of the final image. Additionally, since the magnification in the FIGS. 2a and 2b version is necessarily the same in both the vertical and horizontal planes, it is difficult to fill the clear aperture of the final spherical lens 16 in both of these directions. Thus in FIG. 2b, the horizontal width of lens 16 is not fully utilized (although the vertical height of lens 16 is filled in FIG. 2a).

Thus the FIGS. 3a and 3b version has the following advantages over the simpler FIGS. 2a and 2b embodiment. Both the height of the final image and its tilt may be (independently) varied by the choice of an appropriate pair of cylindrical lenses at 23, 24. By proper choice of the relative focal lengths of these two lenses (and proper positioning of the entire group of lenses 23, 24 and 16'), one may also insure that the entire clear aperture of the The various images are formed as follows:

TABLE II—IMAGERY

[Imagery in "vertical" plane (i.e., as seen in FIG. 3a)]

1. Lenses 22 and 23 have no power in this plane.
2. Parallel rays converged by cylindrical lens 24 at 12 units behind this lens at its focal point, namely, point 15'.
3. Rays from point 15', 372 units in front of spherical lens 16' (and its own focal point) are rendered parallel again at 17'.

[Imagery in "horizontal" plane (FIG. 3b)]

1. Parallel rays converged by tilted cylinder 22 to a similarly tilted line, all points of which lie the same (focal length of cylinder 22) distance behind nearest part of lens (as measured by common perpendicular between tilted lens and tilted line), namely, 6 units.
2. For a center-to-center spacing of 33.8 units between tilted cylinder 22 and cylinder 23, the center, I$_c$, of image I will be 27.8 units from cylinder 23 (having a focal length of 50 units) and will therefore be reimaged at −62.7 units (a virtual image, 62.7 units to the *left* of lens 23).
3. This virtual image is therefore 62.7+50=112.7 units to the left of point 15', and therefore is 112.7+372=484.7 units to the left of lens 16' (cylinder 24, having no power in this plane does not substantially affect the imagery). Therefore spherical lens 16' (of effective focal length 372) reimages this virtual image (484.7 units to its left) at a conjugate focal point 1600 units to the right of the lens.*

In the specific system just described, the "horizontal" longitudinal magnification (M$_{oh}$) of the telescopic system formed by cylindrical lens 23 and spherical lens 16' is the square of the ratio of their focal lengths ($m_h$), i.e., the square of 372 divided by 50. The "vertical" lateral magnification ($m_{av}$) of the telescopic system of cylinder 24 and spherical lens 16' is simply the ratio of their focal lengths ($m_v$), i.e., 372 divided by 12. Therefore the tilt angle i' of the final image (not shown) may be found from the following relationship, once the tilt angle i of the original image (I) is determined:

$$\frac{\tan i'}{\tan i} = \frac{M_{ch}}{-m_{av}} = \frac{m_h^2}{-m_v} = \frac{\left(\frac{372}{50}\right)^2}{-\frac{372}{12}} = -1.79$$

---

* The various other points of image I will be reimaged at various distances behind lens 16' depending on the initial tilt of cylinder 22 (and therefore image I), since their varying distance from cylinder 23 will cause different imagery throughout the right-hand part of the system.

In the above equation, the minus sign again indicates that the final image is inverted relative to the original image (I); or in other words, the final image tilt angle $i'$ is on the opposite side of the reference line (the vertical) relative to the original image tilt angle $i$. The vertical extent of the final image (not shown) will be the full distance between the extreme collimated rays 17' as seen in FIGURE 3a. This will be determined solely by the lateral magnification in this vertical plane (i.e., $m_{av}$ or $m_v$). Therefore the ratio of the height of the final image to the height of the original image will be: 372 divided by 12, or 31 to 1. Thus all the optical elements except the final spherical lens 16' need have clear apertures in the vertical direction (i.e., as seen in FIGURE 3a) of only two units to yield a final image which has a vertical "height" of 62 units (by "height" is meant the vertical extent as seen in FIG. 3a, the "length" of the final tilted image as measured along its own straight line of course being even greater than this).

So as to avoid obscuring the general principles of the invention as shown in FIGS. 3a and 3b by the specific numerical example just given, it is emphasized that one may choose the diameter of lens 16' and the ratio of the focal length of cylindrical lens 24 and the final spherical lens 16' so as to give the desired vertical height of the final image, and then choose the focal length of cylinder 23 so as to give the "tilt magnification" desired or expedient under the circumstances. On the other hand, increasing the focal length (and of course the clear aperture linearly therewith) of only the final spherical element 16' will increase both the tilt and the vertical height of the final image. By choosing an appropriate value for the relative focal lengths of cylindrical lens 23, cylindrical lens 24 and spherical lens 16', and by adjusting the tilt of cylinder 22, almost any degree of tilt of the final image may be accomplished. By increasing the ratio of the focal length of spherical lens 16' to that of cylindrical lens 24, the final image may have almost any desired vertical height or extent.

As previously noted, optical systems of the type shown in FIGURES 3a and 3b are much more versatile because of the presence of two crossed cylindrical lenses 23 and 24 than the otherwise similar system of FIGS 2a and 2b. This is true because the cylindrical lens 23 (in conjunction with spherical lens 16') determines not only the position of the central point of the final image but also the longitudinal position (i.e., the position in the direction along the optical axis) of the various points of the final image relative to the center image point; while cylindrical lens 24 (in relation with spherical lens 16') determines the lateral position (i.e., how far from the optical axis as measured perpendicular thereto) these various points in the final image will be. Thus changing the focal length (and position so as to maintain the telescopic relationship) of cylindrical lens 23 will cause each of the points in the final image on one side of the image center (i.e., the image point lying on the optical axis) to move, say, closer to lens 16', whilie all the image points on the opposite side of the image center will move in the opposite direction (i.e., away from lens 16'). If the telescopic arrangement of lenses 23 and 16' is not disturbed, the new longitudinal positions of all of these points will be at a distance from the final image center equal to their previous longitudinal distance times the same constant (specifically, the ratio of the squares of the focal lengths of the two different lenses used for lens 23). Because of this proportional position change there will be no change in the relative intensity of light reaching each of the points in the final image after such a change of lenses at 23. In other words, the intensity at all such final image points will still be directly proportional to the intensity of the corresponding point on original image I (i.e., equal to this intensity times the same constant for all such points). Therefore, change of lens 23 to a different focal length will only change this constant (equally for all points), and the intensities will retain the same values relative to each other. In this manner the distribution of energy in the original image I is faithfully (i.e., proportionally) reproduced in the final image regardless of what focal length lens is chosen to be used at 23.

Changing the focal length of the second cylinder 24 while maintaining its telescopic arrangement with spherical lens 16' will vary the lateral "height" (i.e., the vertical extent between rays 17' in FIG. 3a) of the final image. Therefore each of the image points would assume a different distance from the optical axis if such a change in lens 24 is made. More particularly, each of the image points would assume a new position as measured laterally from the optical axis which is proportional to their original distance from the optical axis. The constant of proportionality here is, of course, the ratio of the original and new focal lengths of lens 24. Again, the relative distribution of energy in the original image I is faithfully maintained in the final image. Although it is not immediately obvious that this change also corresponds to a change in the tilt of the final image, a little reflection will show that varying the lateral position of the points of the tilted straight line image without varying their longitudinal position also causes a change of tilt of the straight line.

Perhaps the easiest manner to visualize the effect of changing the focal length of either of the cylindrical lenses 23 or 24 is to think of the final image as a straight line graph in Cartesian coordinates. If one thinks of the vertical height as seen in FIG. 3a the $y$-axis and the optical axis as the $x$-axis of such a Cartesian coordinate system, it then becomes obvious that multiplying all of the $y$ values by a constant ($M_{oh}$ or $m_h{}^2$) will change the slope of the straight line by the same constant; alternatively multiplying the $x$ values of the function represented by the straight line by a constant (namely, $m_v$) will cause the new straight line to have a slope which differs from the slope of the original line by a factor of the reciprocal of the constant. These facts are, of course, inherent in the previously given equation:

$$\frac{\tan i'}{\tan i} = \frac{m_h{}^2}{-m_v}$$

Since:

$$m_h = -\frac{f_6}{f_3}$$

and $$m_v = -\frac{f_6}{f_4}$$

where $f_6$ is the focal length of spherical lens 16', $f_3$ is the focal length of cylindrical lens 23, and $f_4$ is the focal length of cylinder 24, we may write:

$$\frac{\tan i'}{\tan i} = \frac{\left(\frac{f_6}{f_3}\right)^2}{-\frac{f_6}{f_3}} = -\frac{f_6 f_4}{(f_3)^2}$$

Thus, in a system of the type shown in FIGURES 3a and 3b the tilt or slope of the final straight line image may be varied relative to the tilt of the original line image I by changing the focal length of any one (or more) of the three lenses (16', 23, 24).

Because of the greater latitude that the designer has in choosing the various parameters of this system relative to that shown in FIGURES 2a and 2b, one may obtain almost an indefinitely large image in vertical height of almost any desired angle of tilt. Thus, a sufficiently large diameter spherical lens 16' is chosen for the former purpose, the lens having an appropriate practical focal length. For this focal length (and clear aperture) spherical lens 16', the focal length of cylindrical lens 24 may be chosen (of sufficient relative aperture) to "fill" this vertical field; and then an appropriate value for the focal length (and relative aperture) of cylindrical lens 23 may be chosen relative to the other focal lengths (and clear apertures) to obtain the desired magnification of tilt (and a bright image). Obviously the specific values of the parameters of the various lenses may be calculated in a different order, the above giving one manner in which the desired effect (tilt and height of the final image) may be reached by varying the parameters of one or more of the three lenses.

A highly corrected system and even more versatile system is shown in FIGURES 4a and 4b. The four central optical components 31, 32, 33 and 34 generally correspond to the four optical elements 11, 22, 23 and 24 in FIGURES 3a and 3b, and are respectively a spherical objective 31, a tilted two-element cylindrical component 32, and two single element cylindrical components 33 and 34 having their power axes crossed. Since the system of FIGURES 4a and 4b is specifically designed for use with monochromatic light, in place of the point source of light shown in the previous versions, a source of collimated monochromatic light (such as a laser) is indicated at 20 at the extreme left-hand side of these figures, followed in turn by a spherical condenser 28 and a pinhole diaphragm 29. By positioning spherical condenser 28 a distance equal to its focal length in front of the pinhole diaphragm 29, the parallel monochromatic light from laser 20 will be focused to a point in the central aperture 30 of diaphragm 29. This point image at 30 behaves in substantially the same manner as the point source schematically illustrated in the previous figures at 10, and the actual light source of FIGURES 4a and 4b (i.e., elements 20, 28 and 29) may be used in these earlier figures as well. Thus the various components 30–34 in FIGURES 4a and 4b correspond very closely to those elements in FIGURES 3a and 3b, which are numbered either 10 or 20 lower. In fact, all of these elements may be considered essentially the same as the corresponding elements in FIGURES 3a and 3b (except of course for specific numerical data), with the following exceptions. The titlted cylinder 32 is composed of two (in the illustrated embodiment, identical) cylindrical elements rather than a single cylindrical element, as was true of the previous embodiments; and this pair (together) may be moved over a range as schematically illustrated by double arrow 33' so as to change the position of the final image (not shown), as will appear hereinafter. The cylindrical lens 33 is "bent" into a meniscus form.

In a manner analogous to that previously described in regard to FIGURES 2a and 2b and FIGURES 3a and 3b, spherical objective 31 collimates the light from the point source (image) in the aperture 30, so that tilted cylinder 32 receives this parallel light and forms a tilted line image at I, as may best be seen at FIGURE 4a. An optional tilted slit or stop may be positioned as shown at 38 so as to mask light other than from this image I from the rest of the system. This tilted slit 38 will be longitudinally adjustable along with the tilted cylinder pair 32. As in the previous versions the tilted cylinder of course does not affect the collimation in the vertical plane (see FIGURE 4a), nor does the cylindrical meniscus 33. In the horizontal plane of FIGURE 4b, however, the positive (converging) meniscus cylinder 33 will bend the rays as they leave the point $I_c$ so that these diverging rays will at least diverge at a lesser rate or angle. The final cylindrical lens 34 will of course have substantially no effect in the horizontal plane of FIGURE 4b, (or more specifically only an effect analogous to that of a plane parallel glass plate) but will converge the rays which are parallel in the vertical plane (see FIG. 4a) to a point 35 (which corresponds to point 15' in FIG. 3a), at which point an optional slit diaphragm or stop 39 may be placed. The behavior of the rays beyond (i.e., to the right) of point 35 is very similar to that shown in FIGS. 3a and 3b; namely, the rays are diverging in the vertical plane (FIG. 4a) at a somewhat faster rate from a point 35 than are the already spread rays in the horizontal plane (FIG. 4b). A large spherical collimating lens may then be positioned at a relatively large distance to the right in these figures to perform substantially the same function in the same manner as does the final spherical component 16' in FIGS. 3a and 3b. Specifically, this large lens would have its left-hand principal focal point at 35 (so as to be in the same telescopic arrangement as lens 16' in FIGS. 3a and 3b).

A table of all of the specific optical parameters of a single example conforming to FIGS. 4a and 4b and designed for a laser giving monochromtaic light at 6,328 angstroms, is given below. Because of this monochromacity, the same type of glass may be used for all lenses. In the following specific example, the index of refraction for the wavelength of the laser is 1.6088.

TABLE III

| Lens | Surface | Radius | Axial Thickness (t) or Separation (s) | | Clear Aperture | |
|---|---|---|---|---|---|---|
| | | | t | s | Horizontal | Vertical |
| Spherical: | | | | | | |
| 28 | 41 | +15.22 | 2.0 | | 3.5 | |
| | 42 | (plane) | | 96.89 | | |
| 31 | 43 | (plane) | 3.0 | | 10.5 | |
| | 44 | −45.66 | | (a) | | |
| Cylindrical: (32): | | | | | | |
| 32' | 45(h) | +38.26 | 2.0 | | 7.5 | 7.0(p) |
| | 46 | (plane) | | 0 | | |
| 32'' | 47(h) | +38.26 | 2.0 | | 7.5 | 7.0(p) |
| | 48 | (plane) | | 39.3–49.9 | | |
| 33 | 49(h) | −46.20 | 2.5 | | 7.0 | 7.0 |
| | 50(h) | −15.84 | | 2.0 | | |
| 34 | 51(v) | +22.65 | 2.0 | | 8.0 | 6.0 |
| | 52 | (plane) | | | | | a—Adjustable and reasonably small in practice (i.e., say, from 10–20).
h—Cylindrical with power in "horizontal" plane.
v—Cylindrical with power in "vertical" plane.
p—As measured perpendicular to optical axis; should be divided by cosine of tilt angle of lenses for actual dimension along lenses.

In addition to the distances between these various optical elements (as measured between their adjacent surfaces), the following additional spacings along the optical axis are given. The pinhole diaphragm 29 should be placed 23.76 units behind the rear surface 42 of the first spherical condenser 28. The center of the optional tilted slit diaphragm 38 should be 29.06 units behind the center of the last surface 48 of the tilted cylindrical doublet 32 and movable therewith. The final slit 39 should be placed 35.96 units behind the rear surface 52 of the last cylindrical lens 34. If the final spherical collimating lens (not shown) has a focal length of 364.5 units, it should be placed 400.5 units to the right of the same surface 52 of the last cylinder or 364.5 units behind the slit 39. The variation in the position of the center of the last surface 48 of the tilted cylinders 32 from 39.3 to 49.9 units ahead of the first surface 49 of the cylindrical meniscus 33 will cause the final image (not shown) to vary from 1500 to 2500 units behind the center 35 of slit 39, or 1900 to 2900 units behind the final spherical collimator (not shown).

The "zoom" or variable focal length feature of the system of FIGS. 4a and 4b allows the operator to independently vary the position of the final image (to the right of the final collimating lens, not shown). Therefore this embodiment has even greater versatility than the type shown in FIGS. 3a and 3b. Since monochromatic light is intended to be utilized with the FIGS. 4a and 4b embodiment, there need be no correction for chromatic aberration. The specific example given in Table III and shown in FIGS. 4a and 4b is corrected as to the various other aberrations. Because telescopic systems inherently have equal magnification for all conjugate focal positions of the object image, the telescopic arrangement used in all of the embodiments assures that the radiation intensity at every point in the image will have the same constant of proportionality relative to the corresponding point of the object. Therefore the final image will be a faithful representation of the object (and any earlier images), varying only in its length and tilt by a known factor.

The various embodiments (and especially the more sophisticated ones of FIGS. 3a and 3b and of FIGS. 4a and 4b) are especially useful for certain types of optical data processing (also referred to as "optical correlation"). One example of such data processing requiring an optical system having the properties of a conical lens is the conversion of the raw data obtained from so-called "side-looking" radar. A brief description of this technique is given in "Introduction to Radar Systems," Merrill I. Skolnik, McGraw Hill Book Co., Inc., New York, 1962, at the middle of p. 527. A more complete technical explanation of obtaining the ground mapping data by radar and photographic techniques, and optical correlation of this data (by an optical system using a conical lens) is contained in a paper entitled, "On the Application of Modern Optical Techniques to Radar Data Processing," by L. J. Cutrona, E. N. Leith, L. J. Porcello and W. E. Vivian, presented at the ninth Symposium of the AGARD Avionics Panel on Opto-Electronic Components and Devices, held at Paris, France, under the auspices of NATO on Sept. 6–9, 1965. Preprints of this paper, dated September 1965 have been publicly available for some time.

As previously noted, the invention involves two underlying concepts. The first concept involves the use of a small conical lens (of moderate variation in its focal power) and a telescopic optical system to simulate a large conical lens having a relatively rapid change of its effective focal length along its variable focal power axis. Such a large conical lens would therefore have to be cut from a long cone having a large vertex angle and therefore requiring an extremely large piece of optical glass.

The second underlying principle is the use of a tilted cylindrical lens to simulate the small conical lens, thereby eliminating the need to manufacture any cone-shaped optical element. Additional features include the use of two crossed cylinders (instead of a single spherical element) in the telescope, so as to allow independent choice of the longitudinal and the lateral magnification of this system. Finally, even greater versatility is obtained by making the two tilted cylinders longitudinally adjustable, thereby varying the position of the final image.

Thus the various embodiments provide optical systems simulating large aperture conical lenses having almost any desired valve for both its longest focal length (i.e., its most gently curved) end and its shortest focal length (more sharply curved) end. The first, simplest embodiment accomplishes this by increasing both the effective aperture and apparent variation in the focal power of a small moderately varying conical lens by means of a simple telescopic system. The other embodiments require no actual conical lens element. The use of cylindrical lenses in the telescope part of the system in the latter two embodiments increases the versatility of the system, and allows great freedom in achieving any desired combination of linear size and angle of tilt of the final image. Finally the "zoom" focal length variation of the last embodiment yields additional control over the position of the final image.

The various different combinations of the features distinguishing the four embodiments from each other (as well as from the prior art) may obviously be utilized in optical systems somewhat different from any of the specific embodiments. For this reason the invention is not limited to the particular manner in which the inventive concepts are utilized in any one of these embodiments, but includes these different combinations and variations thereof. Except as required by the specific recitation of the appended claims, the invention is therefore not limited to any of the details of the various disclosed embodiments.

I claim:
1. An optical system having the properties of a large conical lens comprising the following, centered along a single common optical axis:
   an astigmatic optical system for forming a first line image which is tilted at a non-zero angle, $i$, from perpendicularity relative to said optical axis;
   a pair of optical components having dioptric power arranged with a pair of their principal focal points in coincidence, so as to be in telescopic arrangement relative to each other;
   said pair of optical components being so positioned behind said first tilted image that said pair of components form a second tilted line image,
   said second tilted image being tilted relative to the optical axis at an angle, $i'$, having a value given by:

$$\frac{\tan i'}{\tan i} = \frac{M}{m}$$

wherein M is the effective longitudinal magnification of the telescopic system formed by said pair of optical components, and $m$ is the effective lateral magnification of said telescopic system formed by said pair of components,
   whereby said second tilted image is, in general, larger in extent and at a different, usually greater, angle of tilt than the first tilted line image.

2. An optical system according to claim 1, in which:
   said optical means for forming said first tilted line image comprises a conical lens of relatively small physical dimensions,
   whereby said pair of optical components in telescopic arrangement cause said second tilted image to be both larger in extent and of different tilt angle than said first tilted image formed by the small conical lens.

3. An optical system according to claim 1 in which:
   said optical means for forming said first tilted line image comprises at least one cylindrical optical component, tilted at an angle equal to $i$.

4. An optical system according to claim 1 in which:
   said optical means for forming said first tilted line image comprises a spherical optical component for rendering parallel radiation from a point and a cylindrical optical component, tilted at an angle, $i$.

5. An optical system according to claim 1 in which:
at least one of said pair of optical components in telescopic arrangement comprises at least one element having cylindrical dioptric power,
whereby the effective longitudinal magnification, M, and the effective lateral magnification, $m$, may be varied independently of each other by choice of different focal lengths of at least some of the various elements comprising said pair of components in each of two mutually perpendicular planes containing the optical axis.

6. An optical system according to claim 1, in which:
said optical means for forming said first tilted line image comprises a spherical optical component for rendering radiation from a point source parallel, and a pair of cylindrical optical elements comprising a first cylindrical lens, tilted from perpendicularity relative to said optical axis in a first plane containing said optical axis and having converging dioptric power in a second plane through said optical axis perpendicular to said first plane,
so as to form said first line image, tilted in said first plane.

7. An optical system according to claim 6, in which:
said pair of cylindrical optical elements comprising said first cylindrical lens are movable along said optical axis, so as to form said first tilted line image at an adjustable longitudinal position along said optical axis;
whereby the longitudinal position of said final image is varied by adjustment of said first cylindrical lens.

8. An optical system according to claim 6 in which:
the first of said pair of telescopically arranged optical components comprises—
a second cylindrical lens having substantially no dioptric power in said first plane, but having dioptric power in said second plane, so as to tend to focus rays from said first tilted line image in said second plane;
and a third cylindrical lens having substantially no dioptric power in said second plane, but havng dioptric power in said first plane, so as to tend to converge the parallel rays from said first tilted line image in said first plane;
and the second of said pair of telescopically arranged optical components comprises a final spherical lens in telescopic arrangement with both said second and third cylindrical lenses, so as to form said final tilted line image.

9. An optical system according to claim 8, in which:
said two cylindrical elements comprising said first cylindrical lens are identical and axially movable together, each said element having a cylindrically convex front surface with a positive cylindrical radius of curvature of 38.26 so as to cause converging cylindrical power in said second plane, an axial thickness of 2.0, and a plane rear surface; the plane rear surface of the front element and the most extended part of the cylindrically convex front surface of the rear element being substantially in line contact;
said second cylindrical lens has its front surface axially positioned 39.3 to 49.9 behind the last surface of said movable first cylindrical lens depending on the axial position thereof, and has a cylindrically concave front surface with a negative cylindrical radius of curvature of 46.20 and a cylindrically convex rear surface with a negative cylindrical radius of curvature of 15.84, said front surface causing relatively stronger negative diverging cylindrical power in said second plane, and said rear surface contributing relatively weaker positive, converging cylindrical power in said same second plane, whereby the overall power of said second cylindrical lens is negative, diverging cylindrical power in said second plane; said surfaces being separated by a distance of 2.5 along the optical axis;
said third cylindrical lens has a cylindrically convex front surface with a positive cylindrical radius of curvature of 22.65, so as to cause positive cylindrical power in said first plane, and a plane rear surface, said surfaces having a central axial separation of 2.0;
said front surface of said third cylindrical lens being spaced 2.0 behind said rear surface of said second cylindrical lens, as measured along the optical axis.

References Cited

UNITED STATES PATENTS

| 2,764,065 | 9/1956 | Buchele | 350—190 |
| 3,317,267 | 5/1967 | Offner | 350—181 |
| 3,364,830 | 1/1968 | Aschenbrenner et al. | 350—181 |

FOREIGN PATENTS

| 109,073 | 4/1940 | Australia. |
| 79,184 | 12/1947 | Germany. |

DAVID SCHONBERG, *Primary Examiner.*

P. R. GILLIAM, *Assistant Examiner.*